United States Patent
Nakamura

(10) Patent No.: US 11,148,778 B2
(45) Date of Patent: Oct. 19, 2021

(54) OUTBOARD MOTOR

(71) Applicant: YAMAHA HATSUDOKI KABUSHIKI KAISHA, Iwata (JP)

(72) Inventor: Daisuke Nakamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/935,237

(22) Filed: Jul. 22, 2020

(65) Prior Publication Data
US 2021/0024193 A1    Jan. 28, 2021

(30) Foreign Application Priority Data

Jul. 25, 2019 (JP) .............................. JP2019-136966

(51) Int. Cl.
*B63H 21/20* (2006.01)
*B63H 20/14* (2006.01)
*B63H 20/24* (2006.01)
*B63H 20/28* (2006.01)

(52) U.S. Cl.
CPC ............. *B63H 21/20* (2013.01); *B63H 20/14* (2013.01); *B63H 20/245* (2013.01); *B63H 20/28* (2013.01); *B63H 2021/205* (2013.01)

(58) Field of Classification Search
CPC .. B63H 21/20; B63H 2021/205; B63H 20/14; B63H 20/245; B63H 20/28
See application file for complete search history.

(56) References Cited

U.S. PATENT DOCUMENTS

| | | | |
|---|---|---|---|
| 2013/0149920 A1* | 6/2013 | Sugiyama | B63H 20/28 440/88 M |
| 2014/0199898 A1* | 7/2014 | Takase | B63H 20/02 440/63 |
| 2017/0349256 A1 | 12/2017 | Nakamura | |
| 2019/0047674 A1* | 2/2019 | Nakamura | B63H 20/20 |
| 2019/0218966 A1* | 7/2019 | Takeda | B63H 20/001 |

FOREIGN PATENT DOCUMENTS

| JP | 4241537 B2 | 3/2009 |
|---|---|---|
| JP | 2017-218016 A | 12/2017 |

OTHER PUBLICATIONS

Official Communication issued in corresponding European Patent Application No. 20187571.3, dated Jan. 19, 2021.

* cited by examiner

*Primary Examiner* — Stephen P Avila
(74) *Attorney, Agent, or Firm* — Keating & Bennett, LLP

(57) ABSTRACT

An outboard motor includes an engine, an electric motor, a propeller that rotates due to a driving force from the engine and a driving force from the electric motor, and an anti-cavitation plate disposed above the propeller. At least a portion of the electric motor is disposed above the anti-cavitation plate and below a waterline of an outboard motor body.

20 Claims, 9 Drawing Sheets

DURING STOPPING OR DURING LOW-SPEED OPERATION

DURING HIGH-SPEED OPERATION

OUTBOARD MOTOR

CROSS REFERENCE TO RELATED APPLICATIONS

This application claims the benefit of priority to Japanese Patent Application No. 2019-136966 filed on Jul. 25, 2019. The entire contents of this application are hereby incorporated herein by reference.

BACKGROUND OF THE INVENTION

1. Field of the Invention

The present invention relates to an outboard motor including an engine and an electric motor.

2. Description of the Related Art

An outboard motor including an engine and an electric motor is known in general. Such an outboard motor is disclosed in Japanese Patent Laid-Open No. 2017-218016, for example.

Japanese Patent Laid-Open No. 2017-218016 discloses an outboard motor including an engine and an electric motor. Both the engine and the electric motor of the outboard motor generate power to rotate a propeller. The engine is driven during high-speed operation. The electric motor is driven during low-speed operation. The outboard motor also includes a cowling that houses the engine and a lower case that houses the electric motor. In addition, the outboard motor includes a water pump that suctions cooling water into the inside of the outboard motor from the outside as the engine is driven. The engine is cooled with the cooling water suctioned by the water pump. The electric motor is cooled by water outside the outboard motor via the lower case positioned in the water.

In the outboard motor described in Japanese Patent Laid-Open No. 2017-218016, the electric motor is housed in the lower case in order to cool the electric motor. Therefore, the dimensions of the lower case conceivably become large, and the underwater resistance of the lower case conceivably becomes large. Thus, in order to significantly reduce the underwater resistance of the lower case, the electric motor is conceivably housed in the cowling that houses the engine instead of the lower case. However, in such a case, it is necessary to newly provide, in the outboard motor, a water pump for the electric motor to pump cooling water from the outside of the outboard motor to the electric motor housed in the cowling. Thus, the structure of the outboard motor becomes complex in order to cool the electric motor. Therefore, conventionally, an outboard motor that significantly reduces or prevents an increase in underwater resistance while significantly reducing or preventing a complex structure that cools an electric motor has been desired.

SUMMARY OF THE INVENTION

Preferred embodiments of the present invention provide outboard motors that each significantly reduce or prevent an increase in underwater resistance while significantly reducing or preventing complex structures that cool electric motors.

As a result of earnest studies to solve the above problems, the inventor has discovered the following structures, focusing on the fact that when a marine vessel is gliding in a high-speed range propelled by an outboard motor (during high-speed operation), a portion of the outboard motor at the same height as or below an anti-cavitation plate is located in the water whereas a portion of the outboard motor above the anti-cavitation plate is located above the water surface. That is, an outboard motor according to a preferred embodiment of the present invention includes an engine, an electric motor, a propeller that rotates due to a driving force from the engine and a driving force from the electric motor, and an anti-cavitation plate disposed above the propeller. At least a portion of the electric motor is disposed above the anti-cavitation plate and below a waterline of an outboard motor body. The "high-speed range" refers to a speed range that is equal to or higher than a medium-high speed and equal to or lower than a maximum speed.

In an outboard motor according to a preferred embodiment of the present invention, as described above, at least the portion of the electric motor is disposed above the anti-cavitation plate. Accordingly, the electric motor is not disposed in a portion of the outboard motor at the same height as or below the anti-cavitation plate, or only the portion of the electric motor is disposed in the portion of the outboard motor at the same height as or below the anti-cavitation plate, and thus an increase in the size of the portion at the same height as or below the anti-cavitation plate is significantly reduced or prevented. Therefore, an increase in the underwater resistance of the portion at the same height as or below the anti-cavitation plate is significantly reduced or prevented. When the marine vessel is gliding in the high-speed range, the electric motor is not driven, and thus cooling of the electric motor is not required. In addition, in a preferred embodiment of the present invention, at least the portion of the electric motor is disposed below the waterline of the outboard motor body. Accordingly, during low-speed operation in which the electric motor is driven and needs to be cooled, at least the portion of the electric motor is located below the water surface. Consequently, it is not necessary to newly provide, in the outboard motor, a water pump for the electric motor to pump water to the electric motor, and thus a complex structure that cools the electric motor is significantly reduced or prevented. Thus, an increase in the underwater resistance of the outboard motor is significantly reduced or prevented while a complex structure of the outboard motor that cools the electric motor is significantly reduced or prevented.

An outboard motor according to a preferred embodiment of the present invention preferably further includes a case that allows water to flow from an outside of the case into the case above the anti-cavitation plate and below the waterline of the outboard motor body, and at least the portion of the electric motor is preferably housed in the case. Accordingly, even when the electric motor is housed in the case, the electric motor is cooled with water that flows into the case. Consequently, the electric motor is cooled efficiently as compared with a case in which water does not flow into the case.

In such a case, the case preferably includes a water storage that surrounds the electric motor and stores the water that has flowed from the outside of the case into the case. Accordingly, the electric motor is cooled in a state in which the water stored in the water storage surrounds the electric motor. Consequently, the area of the electric motor that contacts water (cooling water) is easily increased, and thus the electric motor is cooled more efficiently.

An outboard motor including the case including the water storage preferably further includes a drive shaft that extends in an upward-downward direction and rotates due to the driving force from the engine, the case preferably includes an exhaust passage rearward of the drive shaft, and the electric motor is preferably disposed forward of the drive shaft. When the exhaust passage and the electric motor are both disposed rearward of the drive shaft, and the exhaust passage and the electric motor are disposed in the vicinity of each other, heat is conceivably likely to be transmitted from the exhaust passage, through which relatively high-temperature exhaust gas passes, to the electric motor. In such a case, the temperature of the electric motor conceivably increases. In this regard, according to a preferred embodiment of the present invention, the electric motor is not disposed rearward of the drive shaft including the exhaust passage but is disposed forward of the drive shaft. Accordingly, the drive shaft is disposed between the exhaust passage and the electric motor, and thus the exhaust passage and the electric motor are spaced apart from each other, and thus heat conduction from the exhaust passage to the electric motor is significantly reduced or prevented. Consequently, an increase in the temperature of the electric motor due to the exhaust passage is significantly reduced or prevented.

An outboard motor including the case preferably further includes a propeller shaft to transmit the driving forces from the engine and the electric motor to the propeller, the case preferably includes a lower case that houses the propeller shaft and an upper case that houses at least the portion of the electric motor, the upper case being disposed above the lower case, and a minimum width of the lower case in a right-left direction is preferably less than a maximum width of the electric motor in the right-left direction. Accordingly, even when the electric motor is provided in the outboard motor, the minimum width of the lower case in the right-left direction is relatively small, and thus the underwater resistance of the lower case is reduced.

In an outboard motor including the case, the case preferably includes a water inlet through which water flows from the outside of the case into the case. Accordingly, outside water easily flows into the case via the water inlet.

In such a case, the water inlet is preferably provided on a side surface of the case. Accordingly, an opening or a notch, for example, is provided on the side surface of the case such that the water inlet is easily provided.

In an outboard motor including the water inlet on the side surface of the case, the water inlet is preferably open to a front side of the outboard motor on the side surface of the case. Accordingly, when the marine vessel is moved forward by the outboard motor, water that flows from the front side to the rear side more efficiently flows into the case via the water inlet that is open to the front side.

In an outboard motor including the case including the water inlet, the case preferably includes an anti-splash plate disposed above the anti-cavitation plate, and the water inlet is preferably disposed above the anti-cavitation plate and below the anti-splash plate. Accordingly, unlike a case in which the water inlet is disposed in a portion below the anti-cavitation plate, which is located below the water surface even when the marine vessel is gliding, a complex structure of the portion located below the water surface even when the marine vessel is gliding is significantly reduced or prevented. That is, a complex structure of the portion that generates an underwater resistance is significantly reduced or prevented. Furthermore, the water inlet is disposed below the anti-splash plate such that as compared with a case in which the water inlet is disposed above the anti-splash plate, water flows into the case even when the position of the water surface with respect to the outboard motor is relatively low. Consequently, water outside the outboard motor easily flows into the case while a complex structure of the portion that generates an underwater resistance is significantly reduced or prevented.

An outboard motor including the case including the water inlet preferably further includes a water pump to take in water from the outside of the case via a water intake and to supply the water that has been taken in to the engine due to the driving force from the engine, and the water inlet is preferably disposed above the water intake. In order to take in water even when the marine vessel is gliding (during high-speed operation), the water intake is provided in a portion below the water surface even when the marine vessel is gliding (during high-speed operation). Therefore, when the water inlet is provided below the water intake, the water inlet is located in the portion below the water surface even when the marine vessel is gliding. In such a case, the structure of the portion (a surface portion of the case) that generates an underwater resistance conceivably becomes complex. In this regard, according to a preferred embodiment of the present invention, the water inlet is disposed above the water intake such that a complex structure of the surface portion of the case in the portion located below the water surface when the marine vessel is gliding is significantly reduced or prevented. Consequently, an increase in the underwater resistance due to a complex structure of the surface portion of the case is significantly reduced or prevented.

In such a case, the electric motor and the water pump preferably overlap each other at a predetermined height of the outboard motor. Accordingly, unlike a case in which the electric motor and the water pump do not overlap each other at the predetermined height, an increase in the total size of the electric motor and the water pump in the upward-downward direction (height direction) is significantly reduced or prevented.

In an outboard motor including the electric motor and the water pump that overlap each other at the predetermined height, the electric motor and the water pump are preferably disposed adjacent to each other in a forward-rearward direction. Accordingly, as compared with a case in which the electric motor and the water pump are disposed side by side in the right-left direction, an increase in the dimension of the outboard motor in the right-left direction is significantly reduced or prevented. Consequently, an increase in the underwater resistance of the outboard motor is significantly reduced or prevented.

An outboard motor including the case including the water inlet preferably further includes a propeller shaft to transmit the driving forces from the engine and the electric motor to the propeller, the case preferably includes a lower case that houses the propeller shaft and an upper case that houses at least the portion of the electric motor, the upper case being disposed above the lower case, and the water inlet is preferably provided in the upper case. Accordingly, water easily flows into the case (upper case) via the water inlet while a complex structure of the lower case that generates an underwater resistance when the marine vessel is gliding is significantly reduced or prevented.

An outboard motor including the case including the water inlet preferably further includes a propeller shaft to transmit the driving forces from the engine and the electric motor to the propeller, the case preferably includes a lower case that houses the propeller shaft and an upper case that houses at least the portion of the electric motor, the upper case being disposed above the lower case, and the water inlet is preferably provided due to no seal being provided in a boundary between the upper case and the lower case such that water flows from the outside of the case into the case via the water inlet. Accordingly, water flows into the case via the boundary between the upper case and the lower case, and thus water flows into the case without a hole. Consequently, the water inlet is easily provided.

In an outboard motor including the case including the water inlet, the water inlet preferably includes a plurality of water inlets. Accordingly, the dimensions of each of the water inlets are reduced. Consequently, unlike a case in which the dimensions of each water inlet are relatively large, the water inlets are easily disposed in the case while a change in the arrangement of an existing component of the outboard motor is reduced.

An outboard motor according to a preferred embodiment of the present invention preferably further includes an anode disposed below the waterline, and the electric motor is preferably disposed below the anode. Accordingly, the electric motor is disposed below the anode disposed below the waterline, and thus the electric motor is reliably positioned below the water surface during low-speed operation.

In an outboard motor according to a preferred embodiment of the present invention, the electric motor preferably includes a lower end positioned above a lower end of the anti-cavitation plate, and an upper end positioned below the waterline. Accordingly, when the marine vessel is gliding, the entire electric motor is located above the water surface, and when the marine vessel is operating at a low speed, the entire electric motor is located below the water surface. Consequently, an increase in the underwater resistance is significantly reduced or prevented during high-speed operation while the cooling performance of the electric motor is improved during low-speed operation.

In an outboard motor according to a preferred embodiment of the present invention, the electric motor preferably includes a lower end positioned above a bottom of a hull. Accordingly, when the marine vessel is gliding, the bottom of the hull and the water surface are at substantially the same height, and thus the entire electric motor is located above the water surface. Consequently, even when the electric motor is provided in the outboard motor, an increase in the underwater resistance is significantly reduced or prevented.

In such a case, an outboard motor preferably further includes a bracket attached to the hull, and the electric motor preferably includes an upper end positioned below a lower end of the bracket. Accordingly, the electric motor is located in a space below the bracket, and thus the electric motor is easily disposed in the outboard motor, and the electric motor is easily disposed below the waterline.

An outboard motor according to a preferred embodiment of the present invention is attached to a hull, and the outboard motor includes an engine, an electric motor, and a propeller that rotates due to a driving force from the engine and a driving force from the electric motor. At least a portion of the electric motor is disposed above a bottom of the hull and below a waterline of the hull.

In an outboard motor according to a preferred embodiment of the present invention, as described above, an increase in the underwater resistance of the outboard motor is significantly reduced or prevented while a complex structure of the outboard motor that cools the electric motor is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of an outboard motor 100 according to a first preferred embodiment of the present invention is now described with reference to FIGS. 1 to 10.

Figure 1:
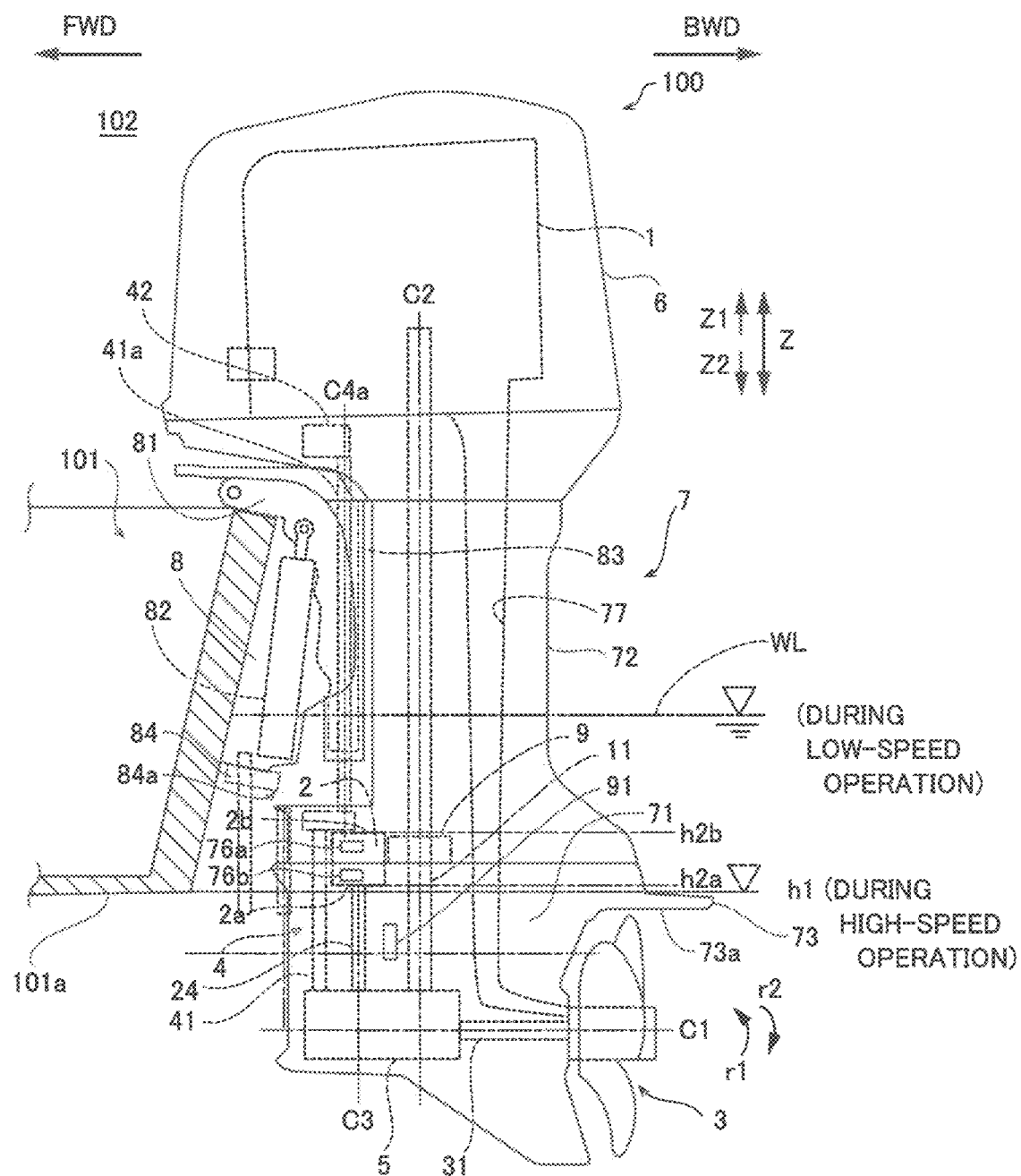
FIG. 1 is a side view schematically showing the overall structure of an outboard motor according to a first preferred embodiment of the present invention.

As shown in FIG. 1, the outboard motor 100 is a marine propulsion unit attached to a portion (rear portion) of a hull 101 in a BWD direction, for example. A marine vessel 102 includes the outboard motor 100 and the hull 101.

In the following description, the term "front (forward)" refers to a direction indicated by "FWD" in the figures and the forward movement direction of the marine vessel 102, and the term "rear (rearward)" refers to a direction indicated by "BWD" in the figures and the reverse movement direction of the marine vessel 102. Furthermore, a "forward-rearward direction" refers to the forward-rearward direction of the marine vessel 102 (outboard motor 100) and a direction (a direction along an axis C1) parallel to a propeller shaft 31 described below, for example. An "upward-downward direction" refers to the trim/tilt direction of the outboard motor 100, an "upward direction" refers to an "arrow Z1 direction", and a "downward direction" refers to an "arrow Z2 direction". A "right-left direction" refers to a direction perpendicular to the upward-downward direction and a direction perpendicular to the forward-rearward direction. A "horizontal direction" refers to a direction along a horizontal plane perpendicular to the upward-downward direction and a steering direction.

The bottom 101a of the hull 101 is positioned at the same height as that of an anti-cavitation plate 73 (hereinafter referred to as a "plate 73") of the outboard motor 100, or at substantially the same height h1 (slightly above (for example, several centimeters above) the lower end 73a of the plate 73) as that of the plate 73. Note that FIG. 1 shows an example in which the bottom 101a is located slightly above (at substantially the same height h1) the lower end 73a of the plate 73.

As shown in FIG. 1, the outboard motor 100 includes an engine 1, an electric motor 2, a propeller 3, a switch 4, a clutch 5, a cowling 6, a case 7, a bracket 8, and a water pump 9. An outboard motor body includes the cowling 6 and the case 7. In the outboard motor 100, a waterline WL is located on the case 7. In this specification, the "waterline WL" refers to the position of the water surface with respect to the outboard motor 100 in a state in which the outboard motor 100 (the engine 1 and the electric motor 2) is not driven or the marine vessel is not in motion. Furthermore, the position of the water surface with respect to the outboard motor 100 is substantially the same as the position of the waterline WL when the outboard motor 100 operates at a low speed (when the marine vessel 102 is traveling due to the driving force of the electric motor 2).

The engine 1 is preferably an internal combustion engine that generates a driving force by combustion of fuel. The outboard motor 100 also includes a drive shaft 11 that extends in the upward-downward direction. The drive shaft 11 rotates about a central axis C2 due to the driving force from the engine 1. Specifically, the drive shaft 11 is connected to a crankshaft (not shown) of the engine 1.

Figure 2:
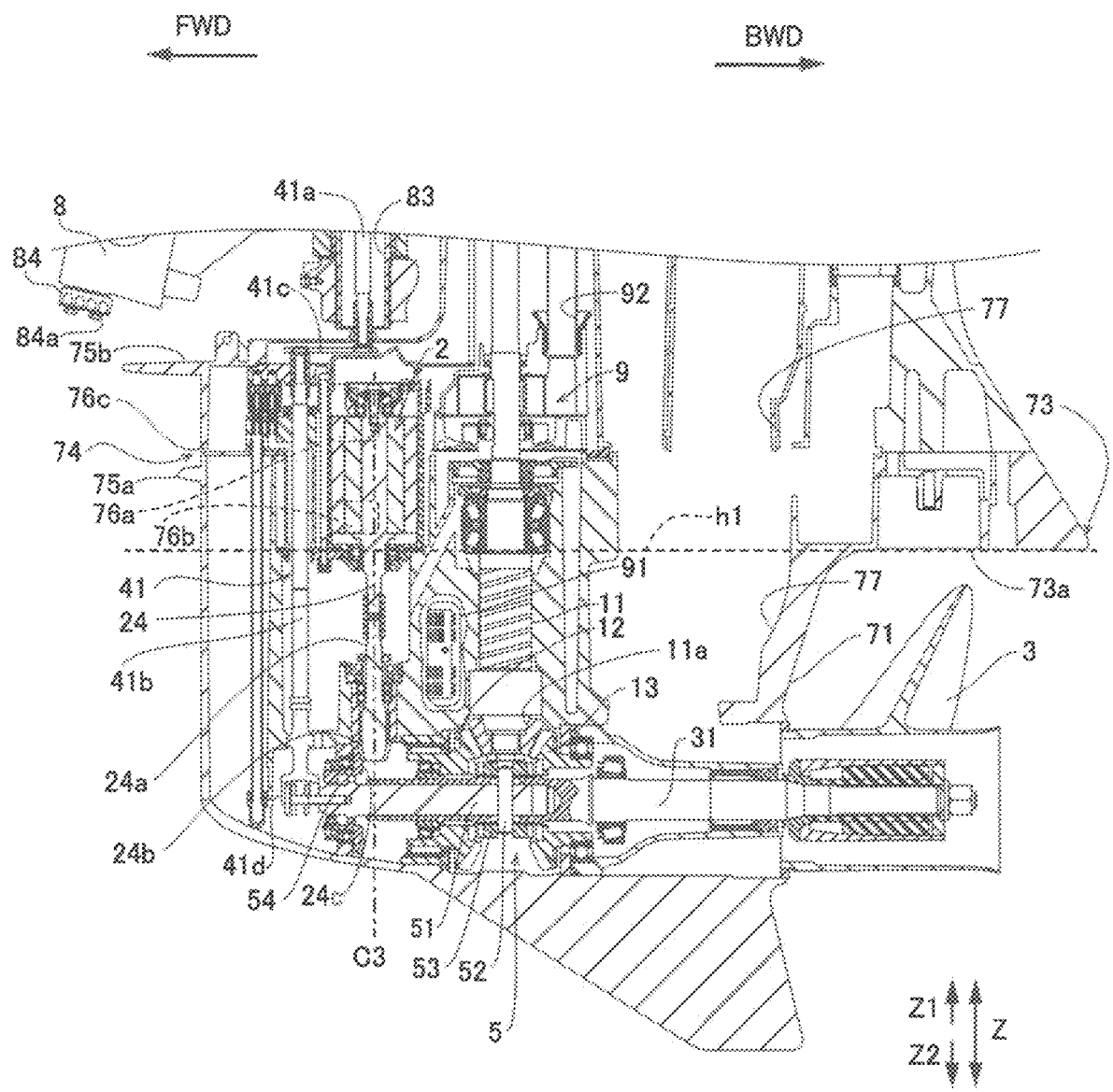
FIG. 2 is a sectional view showing the structure of the outboard motor according to the first preferred embodiment of the present invention.

As shown in FIG. 2, a first bevel gear 11a is provided at the lower end of the drive shaft 11. Furthermore, the outboard motor 100 includes a second front bevel gear 12 and a second rear bevel gear 13. The second front bevel gear 12 is disposed forward of the drive shaft 11, and engages with the first bevel gear 11a. The second rear bevel gear 13 is disposed rearward of the drive shaft 11, and engages with the first bevel gear 11a. Thus, when the drive shaft 11 rotates, both the second front bevel gear 12 and the second rear bevel gear 13 are rotated. The second front bevel gear 12 and the second rear bevel gear 13 are rotated in opposite directions. A driving force is transmitted from the engine 1 to the propeller 3 via the second front bevel gear 12 or the second rear bevel gear 13, the clutch 5, and the propeller shaft 31 described below. A transmission path of the engine 1 including the drive shaft 11, the first bevel gear 11a, the second front bevel gear 12, the clutch 5, and the propeller shaft 31, in this order, provides a driving force defined as a transmission path R1a (see FIG. 8). A transmission path of the engine 1 including the drive shaft 11, the first bevel gear 11a, the second rear bevel gear 13, the clutch 5, and the propeller shaft 31, in this order, provides a driving force defined as a transmission path R1b (see FIG. 9).

As shown in FIG. 1, the propeller 3 rotates due to the driving force from the engine 1 and the driving force from the electric motor 2. The propeller 3 rotates to generate a propulsive force. The outboard motor 100 also includes the propeller shaft 31 that rotates integrally with the propeller 3 about the central axis C1. The propeller shaft 31 extends in the forward-rearward direction.

The cowling 6 houses the engine 1 and an actuator 42 described below. The cowling 6 is disposed above the case 7.

Figure 3:
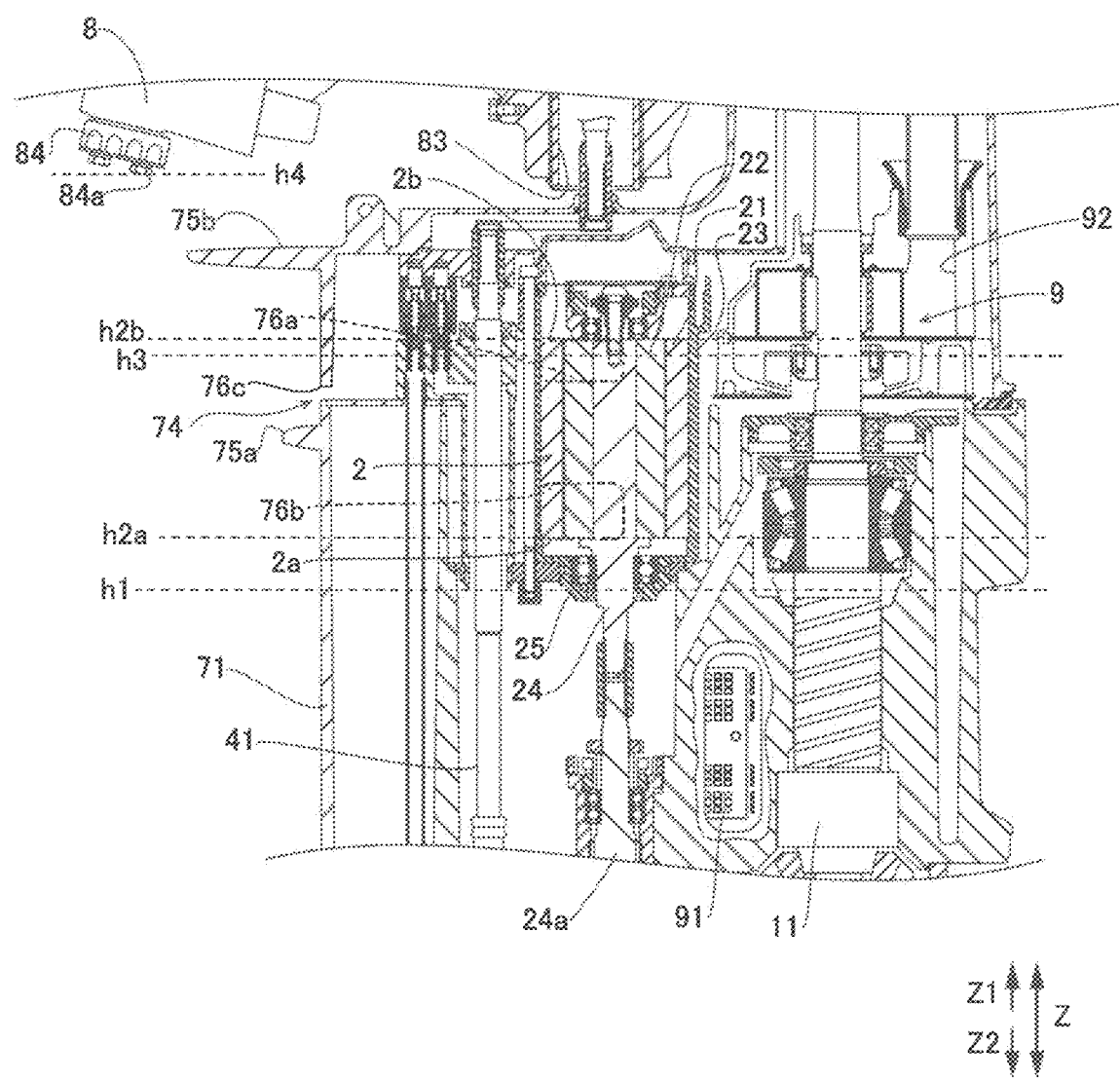
FIG. 3 is a sectional view showing the structure of an electric motor and a case according to the first preferred embodiment of the present invention.

As shown in FIG. 3, the electric motor 2 includes a stator 21 and a rotor 22. The electric motor 2 generates a driving force when electric power is supplied thereto. The outboard motor 100 also includes a motor case 23, a motor shaft 24, and a bearing 25 that supports the motor shaft 24 such that the motor shaft 24 rotates about a central axis C3. The electric motor 2 transmits the generated driving force to the motor shaft 24. The electric motor 2, the motor case 23, the motor shaft 24, and the bearing 25 define a motor unit.

The stator 21 is fixed to the motor case 23. The rotor 22 is disposed inside the stator 21, and rotates with respect to the stator 21. The motor shaft 24 is fixed to the rotor 22, and rotates integrally with the rotor 22. The motor shaft 24 is disposed along the upward-downward direction. That is, the motor shaft 24 is disposed parallel or substantially parallel to the drive shaft 11 and a switching shaft 41 described below. A lower portion of the motor shaft 24 protrudes downward from the motor case 23.

Figure 4:
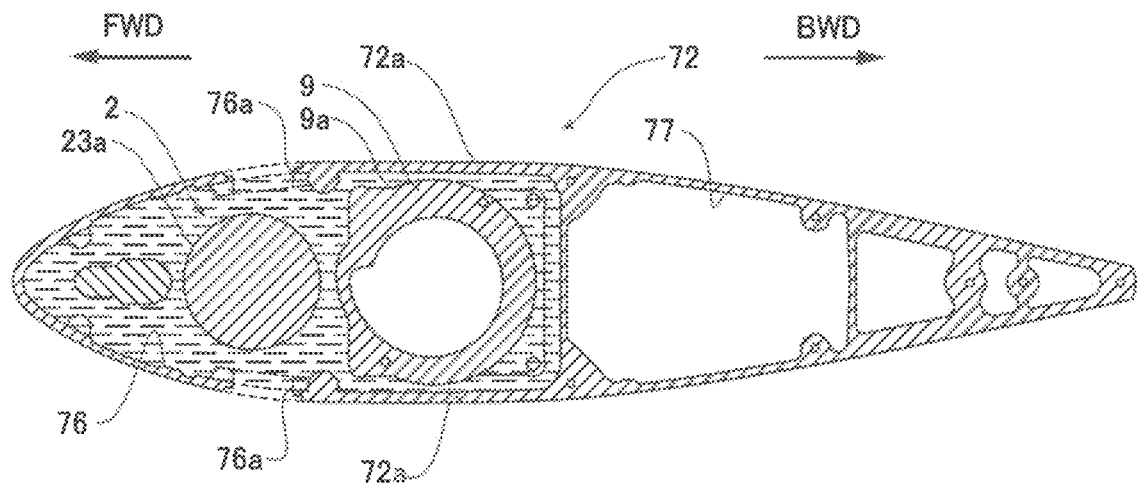
FIG. 4 is a sectional view showing the structure of a water storage during stopping or low-speed operation according to the first preferred embodiment of the present invention.

The motor case 23 houses the stator 21, the rotor 22, and the bearing 25. The motor case 23 houses an upper portion of the motor shaft 24. As shown in FIG. 4, the outer surface 23a of the motor case 23 is exposed to a water storage 76 described below. An upper portion of the motor case 23 is disposed in an upper case 72 described below, and a lower portion of the motor case 23 is disposed in a lower case 71.

As shown in FIG. 2, the motor shaft 24 is disposed forward of the drive shaft 11. Furthermore, the motor shaft 24 is disposed rearward of the switching shaft 41 described below.

The outboard motor 100 also includes a transmission shaft 24a that is disposed coaxially with the motor shaft 24 and below the motor shaft 24 and rotates integrally with the motor shaft 24. The transmission shaft 24a transmits a driving force from the electric motor 2 to the propeller 3 via the clutch 5 and the propeller shaft 31. Specifically, a first motor bevel gear 24b is provided at the tip of the transmission shaft 24a. The outboard motor 100 also includes a second motor bevel gear 24c that engages with the first motor bevel gear 24b. Thus, the motor shaft 24 rotates to rotate the first motor bevel gear 24b and the second motor bevel gear 24c.

A driving force is transmitted from the electric motor 2 to the propeller 3 via the motor shaft 24, the transmission shaft 24a, the first motor bevel gear 24b, the second motor bevel gear 24c, the clutch 5, and the propeller shaft 31. That is, a driving force is transmitted from the electric motor 2 to the propeller shaft 31 via a transmission path R2 (see FIG. 10) provided separately from the transmission paths R1a (see FIG. 8) and R1b (see FIG. 9), described below, through which a driving force is transmitted from the engine 1 to the propeller shaft 31. A transmission path of the electric motor 2 including the motor shaft 24, the transmission shaft 24a, the first motor bevel gear 24b, the second motor bevel gear 24c, the clutch 5, and the propeller shaft 31, in this order, provides a driving force defined as the transmission path R2.

As shown in FIG. 1, in the first preferred embodiment, at least a portion of the electric motor 2 is disposed above the plate 73 and below the waterline WL in the case 7. Specifically, at least a portion of the electric motor 2 is housed below the waterline WL inside the case 7.

More specifically, the lower end 2a of the electric motor 2 is positioned above the lower end 73a of the plate 73, and the upper end 2b of the electric motor 2 is positioned below the waterline WL. That is, the entire electric motor 2 is positioned above the lower end 73a of the plate 73 and below the waterline WL.

Yet more specifically, as shown in FIG. 3, the stator 21 and the rotor 22 are disposed such that the height h2a of the lower end 2a, which is the lowermost portion of the stator 21 and the rotor 22, is higher than the height h1 of the plate 73. Furthermore, the electric motor 2 is disposed such that the height h2b of the upper end 2b, which is the uppermost portion of the stator 21 and the rotor 22, is lower than the waterline WL (see FIG. 1).

The electric motor 2 is disposed below an anode 84. Specifically, the upper end 2b of the electric motor 2 is disposed below the lower end 84a of the anode 84. That is, the height h2b is lower than the height h4 of the lower end 84a of the anode 84. The electric motor 2 is disposed between the plate 73 and the anode 84 in the upward-downward direction.

The electric motor 2 and the water pump 9 overlap each other at a height h3. The height h3 refers to a predetermined height of the water pump 9 in the upward-downward direction. The height h3 is equal to or higher than the height h2a of the lower end 2a of the electric motor 2, and is equal to or lower than the height h2b of the upper end 2b of the electric motor 2. FIG. 4 is a sectional view of the outboard motor 100 at the height h3. As shown in FIG. 4, the electric motor 2 and the water pump 9 are disposed adjacent to each other in the forward-rearward direction.

As shown in FIG. 1, the electric motor 2 is disposed such that the lower end 2a of the electric motor 2 is positioned above the bottom 101a of the hull 101. That is, the height h2a of the lower end 2a of the electric motor 2 is higher than the height h1 of the bottom 101a.

As shown in FIG. 1, the case 7 includes the lower case 71 and the upper case 72. The lower case 71 is disposed below the upper case 72, and houses the propeller shaft 31.

As shown in FIG. 2, the lower case 71 also houses the motor shaft 24, the transmission shaft 24a, the first motor bevel gear 24b, the second motor bevel gear 24c, the drive shaft 11, the first bevel gear 11a, the second front bevel gear 12, the second rear bevel gear 13, and the clutch 5.

The lower case 71 includes the plate 73 to significantly reduce or prevent the occurrence of cavitation in the vicinity of the propeller 3. The plate 73 is disposed above the propeller 3. The height h1 of the plate 73 is the same or substantially the same as the height of the water surface when the marine vessel 102 is traveling (gliding) in a high-speed range due to operation of the outboard motor 100 (during high-speed operation). When the marine vessel 102 travels (glides) in the high-speed range due to operation of the outboard motor 100, a driving force is transmitted from the engine 1 to the propeller 3 via the transmission path R1a. When the marine vessel 102 travels at a low speed due to operation of the outboard motor 100, a driving force is transmitted from the electric motor 2 to the propeller 3 via the transmission path R2. A portion of the lower case 71 below the plate 73 is positioned below the water surface during both traveling and stopping.

Figure 6:
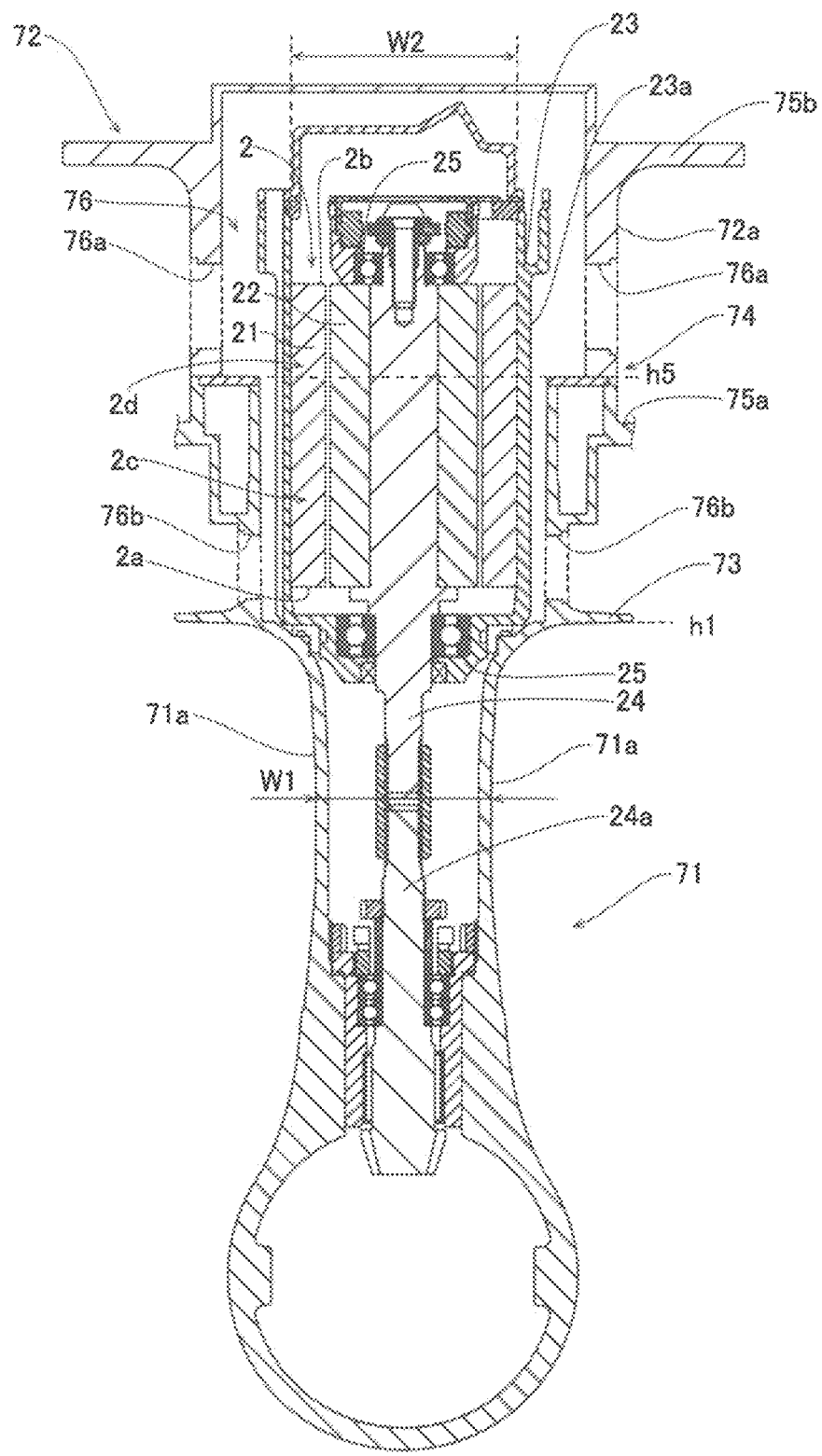
FIG. 6 is a sectional view showing the structure of the electric motor and a lower case according to the first preferred embodiment of the present invention.

As shown in FIG. 6, in the first preferred embodiment, the minimum width W1 of the lower case 71 in the right-left direction is less than the maximum width W2 of the electric motor 2 in the right-left direction. That is, the minimum width W1, which is the shortest distance between the right and left side surfaces 71a of the lower case 71, is less than the maximum width W2 of the electric motor 2 in the right-left direction. The maximum width W2 of the electric motor 2 corresponds to the outer diameter of the annular stator 21.

The lower case 71 houses a lower portion 2c of the electric motor 2. Specifically, the lower case 71 houses the electric motor 2 such that the lower end 2a of the electric motor 2 is positioned above the height h1 of the lower end 73a of the plate 73 of the lower case 71 and below the height h5 of a boundary 74 between the lower case 71 and the upper case 72.

Figure 7:
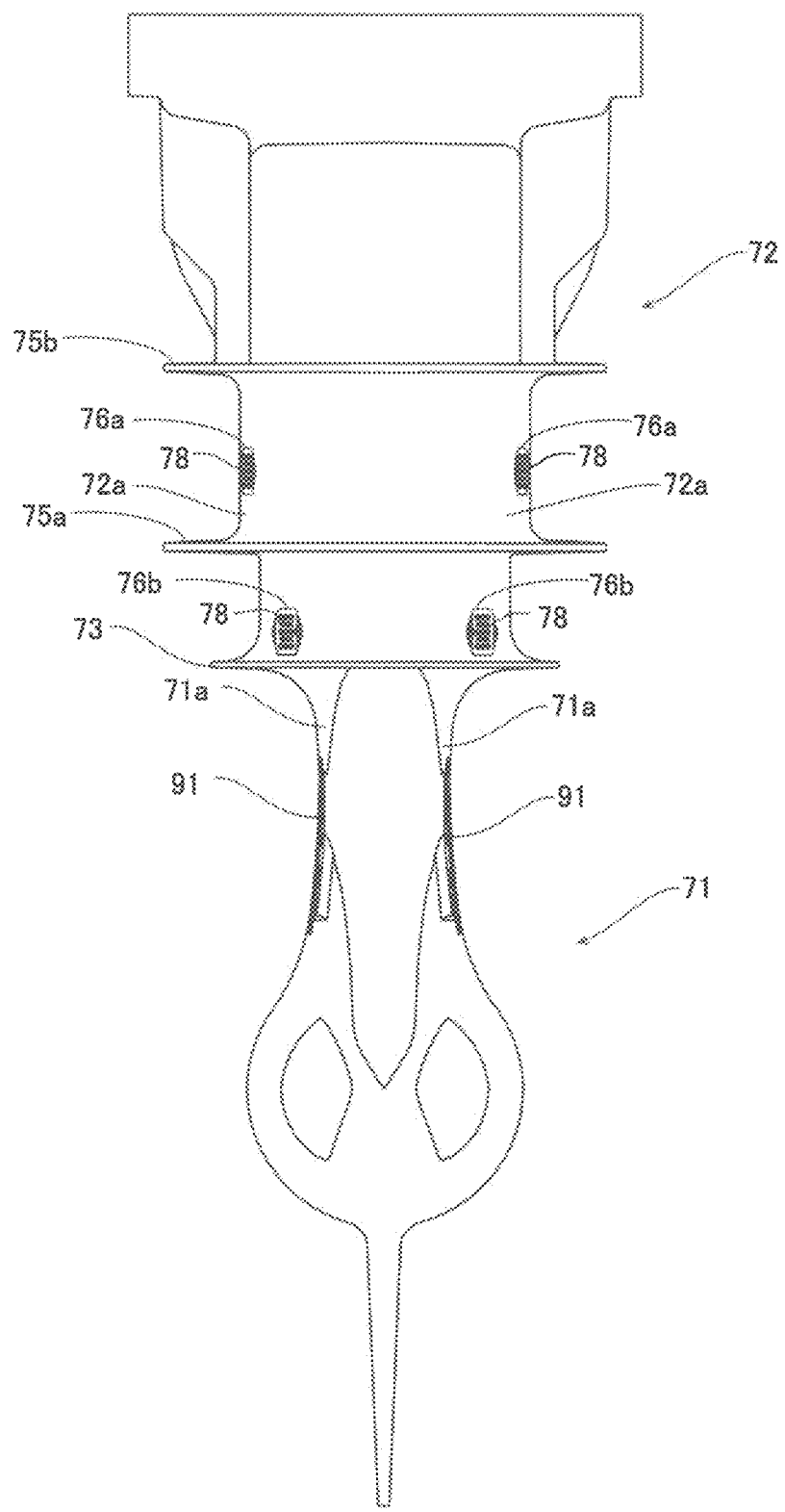
FIG. 7 is a front view showing the structure of an upper case and the lower case according to the first preferred embodiment of the present invention.

As shown in FIG. 7, water intakes 91 are provided on the side surfaces 71a of the lower case 71 such that the water pump 9 (see FIG. 2) takes in water from the outside of the case 7. The water intakes 91 are located below the plate 73 (height h1).

A lower anti-splash plate 75a (hereinafter referred to as a "lower plate 75a") is provided above the plate 73 in the lower case 71. The lower plate 75a, together with an upper anti-splash plate 75b described below, has a function of significantly reducing or preventing rising of water splashed from the water surface (height h1) during high-speed operation above the bracket 8 and the hull 101.

As shown in FIG. 6, the upper case 72 is disposed above the lower case 71. The upper case 72 houses an upper portion 2d of the electric motor 2. That is, the electric motor 2 straddles the lower case 71 and the upper case 72. As shown in FIG. 2, the upper case 72 houses the drive shaft 11 and the water pump 9.

As shown in FIG. 7, the upper case 72 includes the upper anti-splash plate 75b (hereinafter referred to as an "upper plate 75b") disposed above the plate 73 and above the lower plate 75a. The upper plate 75b is an example of an "anti-splash plate".

As shown in FIG. 1, the bracket 8 is disposed forward of the cowling 6 and the case 7. The bracket 8 includes a crank 81 fixed to the hull 101 and a tilt shaft 82 that rotates the outboard motor 100 in the trim/tilt direction. The bracket 8 also includes a steering shaft 83. The steering shaft 83 is a rotary shaft that rotates (turns) the outboard motor 100 in the horizontal direction (steering direction). The steering shaft 83 extends in the upward-downward direction.

In the first preferred embodiment, the bracket 8 includes the anode 84. The anode 84 is disposed below the waterline WL. The anode 84 protects the case 7 and the bracket 8 from corrosion by undergoing corrosion due to the electrochemical action of seawater instead of the case 7 and the bracket 8.

As shown in FIG. 2, the water pump 9 is attached to the outer peripheral surface of the drive shaft 11, and uses the rotational driving force of the drive shaft 11 to supply the water taken in via the water intakes 91 to the engine 1 via a cooling water passage 92 in the case 7.

As shown in FIG. 4, in the first preferred embodiment, in the upper case 72 of the case 7, water flows from the outside to the inside above the plate 73 and below the waterline WL. The case 7 includes the water storage 76 that surrounds the electric motor 2 and stores water that has flowed from the outside into the case 7, and an exhaust passage 77 through which exhaust gas from the engine 1 passes.

The water storage 76 is disposed in a front portion of the upper case 72. Specifically, the water storage 76 is disposed forward of the exhaust passage 77. Furthermore, the electric motor 2 housed in the water storage 76 is disposed forward of the drive shaft 11. The exhaust passage 77 is disposed rearward of the drive shaft 11 in the upper case 72.

The water storage 76 is defined by the side surfaces 72a of the upper case 72. Specifically, the water storage 76 is a portion that stores water and is defined by the outer surface 23a of the motor case 23 of the electric motor 2, the outer surface 9a of the water pump 9, and the side surfaces 72a of the upper case 72.

The exhaust passage 77 is a passage through which gas discharged from the engine 1 passes. For example, as shown in FIG. 1, the exhaust passage 77 connects the engine 1 to the propeller 3. Exhaust gas from the engine 1 is discharged to the outside (underwater) of the outboard motor 100 through the exhaust passage 77 via the propeller 3 (cylindrical member).

As shown in FIG. 6, the case 7 (water storage 76) includes openings 76a and 76b through which water flows from the outside into the case 7 (water storage 76). The opening 76a is disposed above the plate 73 and below the upper plate 75b. The opening 76b is disposed above the plate 73 and below the lower plate 75a. The openings 76a and 76b are examples of a "water inlet".

A plurality of openings 76a and a plurality of openings 76b are provided. The openings 76a are disposed on both the side surfaces 72a of the upper case 72, respectively. The openings 76b are disposed on both the side surfaces 71a of the lower case 71, respectively.

As shown in FIG. 7, in the first preferred embodiment, the openings 76a are open to the front side on the side surfaces 72a. That is, when the upper case 72 is viewed from the front side, the openings 76a are visible. The openings 76b are open to the front side on the side surfaces 71a. That is, when the lower case 71 is viewed from the front side, the openings 76b are visible. A mesh-shaped filter 78 is provided in each of the openings 76a. The filter 78 has a function of preventing debris, etc. in the water from entering the water storage 76.

As shown in FIG. 3, the openings 76a and 76b overlap with the electric motor 2 as viewed in the right-left direction (in FIG. 3, the left direction, for example). The openings 76a and 76b have, for example, a substantially rectangular shape.

In the first preferred embodiment, a seal is not provided in the boundary 74 between the upper case 72 and the lower case 71 such that a clearance 76c through which water flows into the water storage 76 is provided. That is, the clearance 76c is a gap between the lower end surface of the upper case 72 and the upper end surface of the lower case 71. The clearance 76c is an example of a "water inlet".

Figure 5:
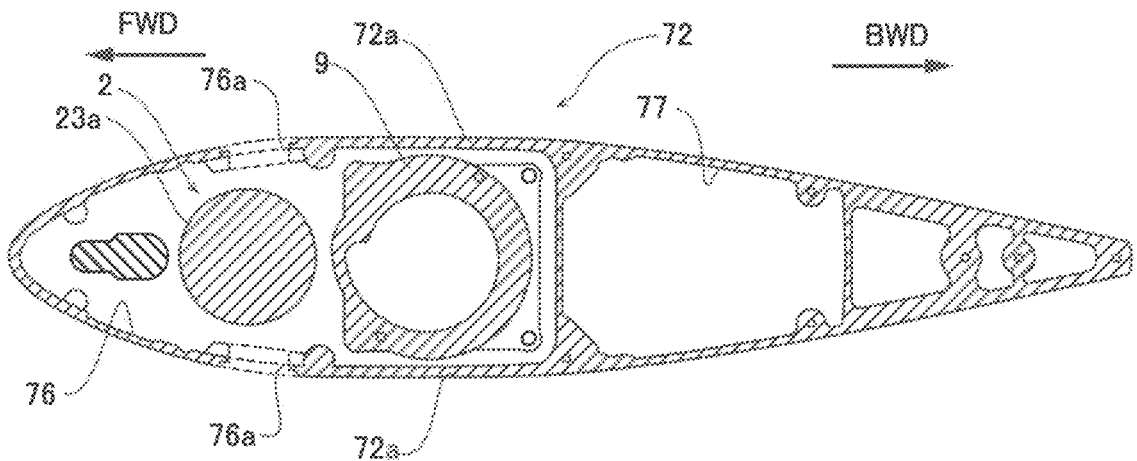
FIG. 5 is a sectional view showing the structure of the water storage during high-speed operation according to the first preferred embodiment of the present invention.

As shown in FIG. 5, during high-speed operation in which the marine vessel 102 is traveling (gliding) in the high-speed range due to operation of the outboard motor 100, the openings 76a and 76b of the water storage 76 are located above the water surface (height h1). Thus, the water stored in the water storage 76 is discharged to the outside of the outboard motor 100 via the openings 76a and 76b.

Figure 8:
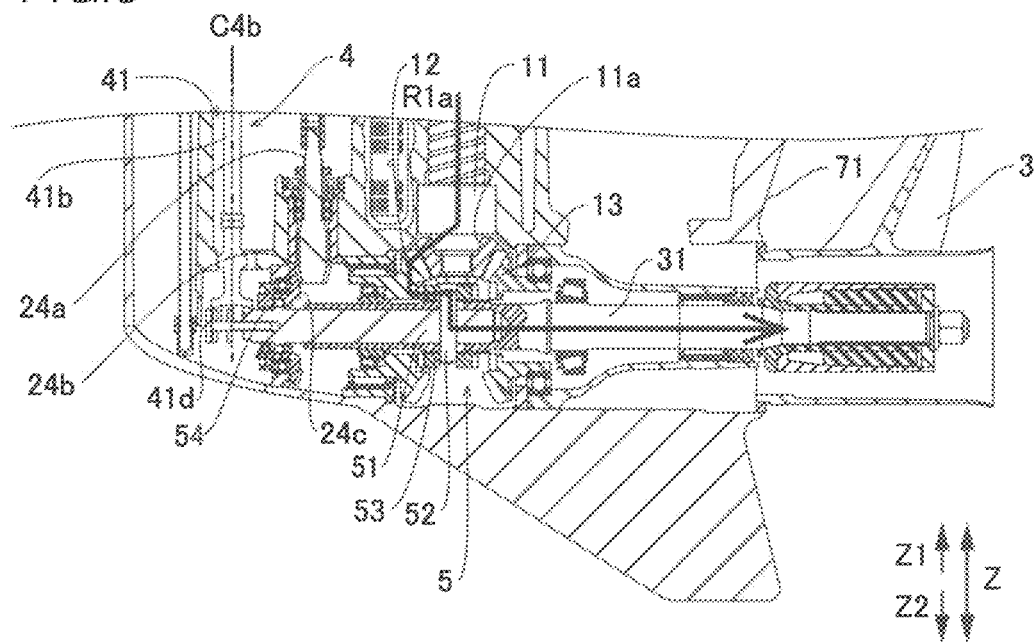
FIG. 8 is a diagram illustrating a transmission path (forward movement) of a driving force from an engine according to the first preferred embodiment of the present invention.
Figure 9:
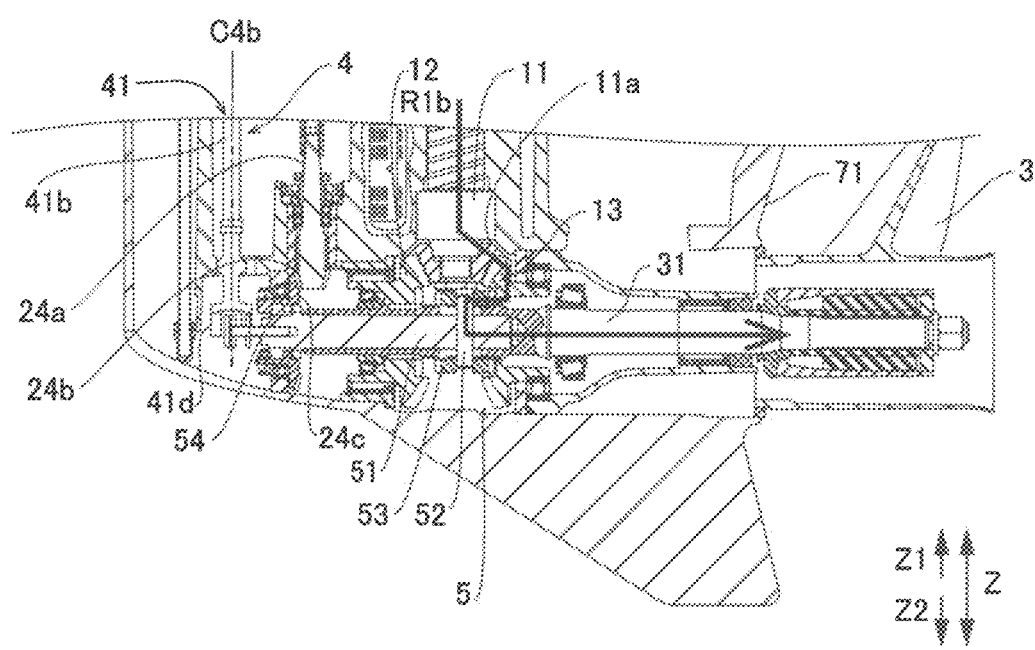
FIG. 9 is a diagram illustrating a transmission path (rearward movement) of a driving force from the engine according to the first preferred embodiment of the present invention.
Figure 10:
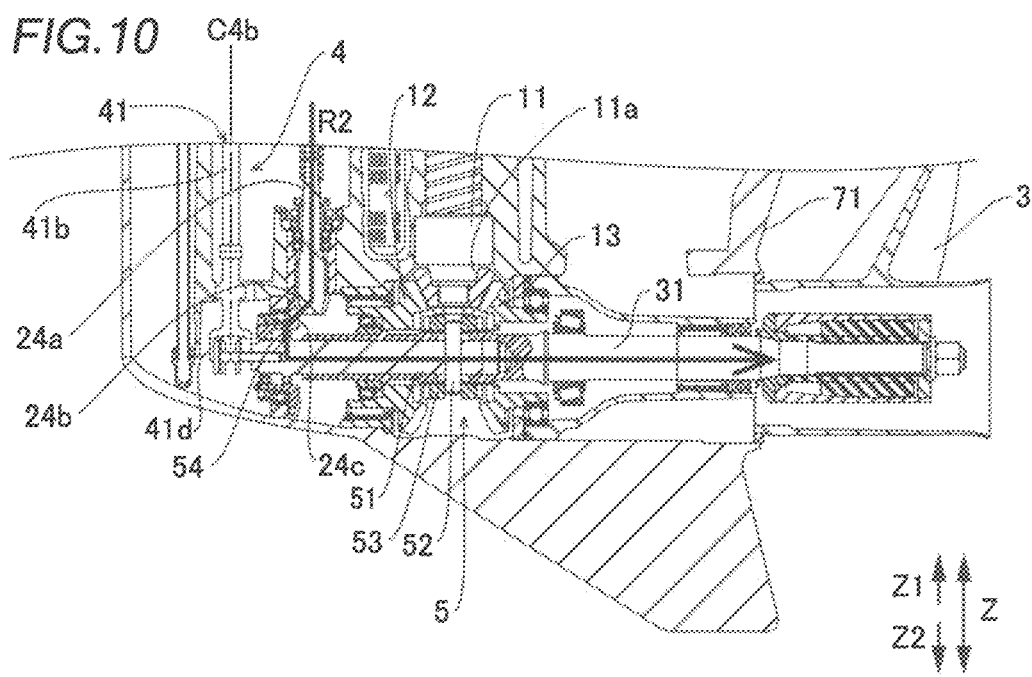
FIG. 10 is a diagram illustrating a transmission path of a driving force from the electric motor according to the first preferred embodiment of the present invention.

As shown in FIGS. 8 to 10, the switch 4 and the clutch 5 switch a path (transmission path R1a, R1b, or R2) of a driving force transmitted to the propeller 3. The switch 4 includes the switching shaft 41 and the electric actuator 42 (see FIG. 1) that rotates the switching shaft 41.

As shown in FIG. 2, the switching shaft 41 includes an upper portion 41a that extends in the upward-downward direction and is connected to the actuator 42 (see FIG. 1), a lower portion 41b that extends in the upward-downward direction and is disposed inside the lower case 71, and a gearing 41c that connects the upper portion 41a to the lower portion 41b. The upper portion 41a extends from the lower case 71 to the cowling 6 via the inside of the steering shaft 83 described below. The lower portion 41b is disposed forward of the drive shaft 11 and forward of the motor shaft 24. The gearing 41c connects, above the electric motor 2, the upper portion 41a to the lower portion 41b disposed forward of the upper portion 41a. The gearing 41c transmits a rotating force from the upper portion 41a to the lower portion 41b.

As shown in FIG. 1, the actuator 42 is disposed in the cowling 6. The actuator 42 includes a motor, for example, and rotates the upper portion 41a of the switching shaft 41 about a central axis C4a based on a command signal from an engine control unit (ECU) (not shown). As shown in FIG. 8, the lower portion 41b is rotated about a central axis C4b located forward of the central axis C4a. An eccentric portion 41d deviated from the central axis C4b is provided at the tip of the lower portion 41b.

As shown in FIGS. 8 to 10, the clutch 5 includes a slider 51, a connector 52, dog clutches 53, and a motor clutch 54. The slider 51 is disposed forward of the propeller shaft 31, and slides in the forward-rearward direction in which the propeller shaft 31 extends. The slider 51 engages with the eccentric portion 41d, and is moved by the switching shaft 41. The clutch 5 switches between a state in which a driving force is transmitted from the motor shaft 24 to the propeller shaft 31 and a state in which a driving force is not transmitted according to movement of the slider 51. Furthermore, the clutch 5 switches between a state in which a driving force is transmitted from the drive shaft 11 to the propeller shaft 31 and a state in which a driving force is not transmitted according to movement of the slider 51. Specifically, when the switching shaft 41 is rotated, the eccentric portion 41d moves in the forward-rearward direction, and the position of the slider 51 in the forward-rearward direction changes.

The connector 52 extends in the upward-downward direction perpendicular to the slider 51. The dog clutches 53 are disposed at both ends of the connector 52. The motor clutch 54 includes a portion that protrudes outward in a radial direction (to the side of the second motor bevel gear 24c) forward of the dog clutches 53. The connector 52, the dog clutches 53, and the motor clutch 54 are movable in the forward-rearward direction as the slider 51 slides.

As shown in FIG. 8, the dog clutches 53 engage with the second front bevel gear 12 when moved forward. As shown in FIG. 9, the dog clutches 53 engage with the second rear bevel gear 13 when moved rearward. As shown in FIG. 10, when the dog clutches 53 are positioned at intermediate positions between the front and the rear, the dog clutches 53 do not engage with the second front bevel gear 12 or engage with the second rear bevel gear 13.

As shown in FIG. 10, the motor clutch 54 engages with the second motor bevel gear 24c when the motor clutch 54 is positioned at an intermediate position between the front and the rear. As shown in FIGS. 8 and 9, the motor clutch 54 does not engage with the second motor bevel gear 24c when the motor clutch 54 is positioned at either the front or the rear.

FIG. 8 shows a state in which a driving force is transmitted from the engine 1 to the propeller shaft 31 via the transmission path R1a. When the slider 51 is moved forward, rotation in an r1 direction (see FIG. 1) is transmitted from the second front bevel gear 12 to the dog clutches 53 such that the propeller shaft 31 and the propeller 3 rotate in the r1 direction. Thus, a propulsive force is generated such that the outboard motor 100 moves the marine vessel 102 forward. That is, the outboard motor 100 according to the first preferred embodiment is specified to rotate forward (specified to move forward when the propeller 3 rotates clockwise as viewed from the rear of the outboard motor 100). In such a case, the second front bevel gear 12 functions as a forward gear. In addition, the outboard motor 100 is in a neutral state in which a driving force is not transmitted from the electric motor 2 to the propeller 3.

FIG. 9 shows a state in which a driving force is transmitted from the engine 1 to the propeller shaft 31 via the transmission path R1b. When the slider 51 is moved rearward, rotation in an r2 direction is transmitted from the second rear bevel gear 13 to the dog clutches 53 such that the propeller shaft 31 and the propeller 3 rotate in the r2 direction. Thus, a propulsive force is generated such that the outboard motor 100 moves the marine vessel 102 rearward. In such a case, the second rear bevel gear 13 functions as a reverse gear. In addition, the outboard motor 100 is in the neutral state in which a driving force is not transmitted from the electric motor 2 to the propeller 3.

FIG. 10 shows a state in which a driving force is transmitted from the electric motor 2 to the propeller shaft 31 via the transmission path R2. When the slider 51 is positioned at an intermediate position, rotation in the r1 direction or rotation in the r2 direction is transmitted from the second motor bevel gear 24c to the motor clutch 54 such that the propeller shaft 31 and the propeller 3 rotate in the r1 direction or in the r2 direction. Thus, a propulsive force is generated such that the outboard motor 100 moves the marine vessel 102 forward or rearward. In addition, the outboard motor 100 is in a neutral state in which a driving force is not transmitted from the engine 1 to the propeller 3.

A method for cooling the electric motor 2 of the outboard motor 100 according to the first preferred embodiment is now described with reference to FIGS. 1, 4, and 5.

As shown in FIG. 1, when the outboard motor 100 is operating at a low speed, or when the outboard motor 100 is stopped, the height of the water surface is near the height of the waterline WL. The engine 1 is stopped and the electric motor 2 is driven when the outboard motor 100 operates at a low speed. That is, during low-speed operation, electric power is supplied to the electric motor 2 and is consumed such that the electric motor 2 is driven while generating heat.

In such a case, as shown in FIG. 4, the openings 76a and 76b and the clearance 76c are located below the height (waterline WL) of the water surface, and water flows from the outside of the outboard motor 100 (case 7) into the water storage 76 via the openings 76a and 76b and the clearance 76c. Thus, the outer surface 23a of the motor case 23 that covers the electric motor 2 contacts the inflowing water, and the heat from the electric motor 2 is conducted to the water such that the electric motor 2 is cooled. As shown in FIG. 5, when the outboard motor 100 operates at a high speed or when the outboard motor 100 is tilted up, the water that has flowed into the water storage 76 is discharged to the outside of the outboard motor 100 (case 7) via the openings 76a and 76b and the clearance 76c.

When the outboard motor 100 is operating at a high speed, the height of the water surface is near the height h1 of the plate 73. In such a case, the outboard motor 100 operates due to only the driving force from the engine 1, and thus cooling of the electric motor 2 is not necessary. Furthermore, water pumped from the outside of the outboard motor 100 via the water intakes 91 by the water pump 9 is supplied into the engine 1 via the cooling water passage 92 (see FIG. 3) such that the engine 1 is cooled.

According to the first preferred embodiment of the present invention, the following advantageous effects are achieved.

According to the first preferred embodiment of the present invention, at least a portion of the electric motor 2 is disposed above the plate 73. Accordingly, the electric motor 2 is not disposed in a portion of the outboard motor 100 at the same height as or below the plate 73, or only a portion of the electric motor 2 is disposed in the portion of the outboard motor 100 at the same height as or below the plate 73, and thus an increase in the size of the portion at the same height as or below the plate 73 is significantly reduced or prevented. Therefore, an increase in the underwater resistance of the portion at the same height as or below the plate 73 is significantly reduced or prevented, and thus an increase in the underwater resistance is significantly reduced or prevented even when the electric motor 2 is provided in the outboard motor 100. In addition, in the first preferred embodiment, at least a portion of the electric motor 2 is disposed below the waterline WL of the case 7. Accordingly, during low-speed operation in which the electric motor 2 is driven and needs to be cooled, at least a portion of the electric motor 2 is located below the water surface. Consequently, it is not necessary to newly provide, in the outboard motor 100, a water pump for the electric motor 2 to pump water to the electric motor 2, and thus a complex structure that cools the electric motor 2 is significantly reduced or prevented. Thus, an increase in the underwater resistance of the outboard motor 100 is significantly reduced or prevented while a complex structure of the outboard motor 100 that cools the electric motor 2 is significantly reduced or prevented.

According to the first preferred embodiment of the present invention, the outboard motor 100 includes the case 7 that allows water to flow from the outside of the case 7 into the case 7 above the plate 73 and below the waterline WL of the body of the outboard motor 100. Furthermore, at least a portion of the electric motor 2 is housed in the case 7. Accordingly, even when the electric motor 2 is housed in the case 7, the electric motor 2 is cooled with water that flows into the case 7. Consequently, the electric motor 2 is cooled efficiently as compared with a case in which water does not flow into the case 7.

According to the first preferred embodiment of the present invention, the case 7 includes the water storage 76 that surrounds the electric motor 2 and stores water that has flowed from the outside of the case 7 into the case 7. Accordingly, the electric motor 2 is cooled in a state in which the water stored in the water storage 76 surrounds the electric motor 2. Consequently, the area (the area of the outer surface 23a) of the electric motor 2 (motor case 23) that contacts water (cooling water) is easily increased, and thus the electric motor 2 is cooled more efficiently.

According to the first preferred embodiment of the present invention, the outboard motor 100 includes the drive shaft 11 that extends in the upward-downward direction and rotates due to the driving force from the engine 1. Furthermore, the case 7 includes the exhaust passage 77 rearward of the drive shaft 11. In addition, the electric motor 2 is disposed forward of the drive shaft 11. Accordingly, the drive shaft 11 is disposed between the exhaust passage 77 and the electric motor 2, and thus the exhaust passage 77 and the electric motor 2 are spaced apart from each other, and thus heat conduction from the exhaust passage 77 to the electric motor 2 is significantly reduced or prevented. Consequently, an increase in the temperature of the electric motor 2 due to the exhaust passage 77 is significantly reduced or prevented.

According to the first preferred embodiment of the present invention, the outboard motor 100 includes the propeller shaft 31 that transmits driving forces from the engine 1 and the electric motor 2 to the propeller 3. Furthermore, the case 7 includes the lower case 71 that houses the propeller shaft 31 and the upper case 72 that houses at least a portion of the electric motor 2 and is disposed above the lower case 71. The minimum width W1 of the lower case 71 in the right-left direction is less than the maximum width W2 of the electric motor 2 in the right-left direction. Accordingly, even when the electric motor 2 is provided in the outboard motor 100, the minimum width W1 of the lower case 71 in the right-left direction is relatively small, and thus the underwater resistance of the lower case 71 is reduced.

According to the first preferred embodiment of the present invention, the case 7 includes the openings 76a and 76b and the clearance 76c through which water flows from the outside of the case 7 into the case 7. Accordingly, outside water easily flows into the case 7 via the openings 76a and 76b and the clearance 76c.

According to the first preferred embodiment of the present invention, the openings 76a and 76b are provided on the side surfaces 72a and 71a of the case 7. Accordingly, the openings are provided on the side surfaces 72a and 71a of the case 7 such that the openings 76a and 76b through which water flows in are easily provided.

According to the first preferred embodiment of the present invention, the openings 76a and 76b are open to the front side on the side surfaces 72a and 71a of the case 7. Accordingly, when the marine vessel 102 is moved forward by the outboard motor 100, water that flows from the front side to the rear side easily flows into the case 7 via the openings 76a and 76b that are open to the front side.

According to the first preferred embodiment of the present invention, the case 7 includes the upper plate 75b disposed above the plate 73. Furthermore, the openings 76a and 76b are disposed above the plate 73 and below the upper plate 75b. Accordingly, unlike a case in which the openings 76a and 76b are disposed in a portion below the plate 73, which is located below the water surface even when the marine vessel 102 is gliding, a complex structure of the portion located below the water surface even when the marine vessel 102 is gliding is significantly reduced or prevented. That is, a complex structure of the portion that generates an underwater resistance is significantly reduced or prevented. Furthermore, the openings 76a and 76b are disposed below the upper plate 75b such that as compared with a case in which the openings 76a and 76b are disposed above the upper plate 75b, water flows into the case 7 even when the position of the water surface with respect to the outboard motor 100 is relatively low. Consequently, water outside the outboard motor 100 easily flows into the case 7 while a complex structure of the portion that generates an underwater resistance is significantly reduced or prevented.

According to the first preferred embodiment of the present invention, the outboard motor 100 includes the water pump 9 to take in water from the outside of the case 7 via the water intakes 91 and supplies the taken-in water to the engine 1 due to the driving force from the engine 1. Furthermore, the openings 76a and 76b and the clearance 76c are disposed above the water intakes 91. Accordingly, a complex structure of a surface portion (side surfaces 71a) of the case 7 in the portion located below the water surface when the marine vessel 102 is gliding is significantly reduced or prevented. Consequently, an increase in the underwater resistance due to a complex structure of the surface portion (side surfaces 71a) of the case 7 is significantly reduced or prevented.

According to the first preferred embodiment of the present invention, the electric motor 2 and the water pump 9 overlap each other at the height h3. Accordingly, unlike a case in which the electric motor 2 and the water pump 9 do not overlap each other at the height h3, an increase in the total size of the electric motor 2 and the water pump 9 in the upward-downward direction (height direction) is significantly reduced or prevented.

According to the first preferred embodiment of the present invention, the electric motor 2 and the water pump 9 are disposed adjacent to each other in the forward-rearward direction. Accordingly, as compared with a case in which the electric motor 2 and the water pump 9 are disposed side by side in the right-left direction, an increase in the dimension of the outboard motor 100 in the right-left direction is significantly reduced or prevented. Consequently, an increase in the underwater resistance of the outboard motor 100 is significantly reduced or prevented.

According to the first preferred embodiment of the present invention, the outboard motor 100 includes the propeller shaft 31 that transmits driving forces from the engine 1 and the electric motor 2 to the propeller 3. Furthermore, the case 7 includes the lower case 71 that houses the propeller shaft 31 and the upper case 72 that houses at least a portion of the electric motor 2 and is disposed above the lower case 71. In addition, the openings 76a are provided in the upper case 72. Accordingly, water easily flows into the case 7 (upper case) via the openings 76a while a complex structure of the lower case 71 that generates an underwater resistance when the marine vessel 102 is gliding is significantly reduced or prevented.

According to the first preferred embodiment of the present invention, the outboard motor 100 includes the plurality of openings 76a and the plurality of openings 76b. Accordingly, the dimensions of each of the openings 76a and 76b are reduced. Consequently, unlike a case in which the dimensions of each opening are relatively large, the openings 76a and 76b are easily disposed in the case 7 while a change in the arrangement of an existing component (such as the lower plate 75a) of the outboard motor 100 is reduced.

According to the first preferred embodiment of the present invention, the outboard motor 100 includes the anode 84 disposed below the waterline WL. Furthermore, the electric motor 2 is disposed below the anode 84. Accordingly, the electric motor 2 is disposed below the anode 84 disposed below the waterline WL, and thus the electric motor 2 is reliably positioned below the water surface during low-speed operation.

According to the first preferred embodiment of the present invention, the electric motor 2 includes the lower end 2a positioned above the lower end 73a of the plate 73, and the upper end 2b positioned below the waterline WL. Accordingly, when the marine vessel 102 is gliding, the entire electric motor 2 is located above the water surface, and when the marine vessel 102 is operating at a low speed, the entire electric motor 2 is located below the water surface. Consequently, an increase in the underwater resistance is significantly reduced or prevented during high-speed operation while the cooling performance of the electric motor 2 is improved during low-speed operation.

According to the first preferred embodiment of the present invention, the electric motor 2 includes the lower end 2a positioned above the bottom 101a of the hull 101. Accordingly, when the marine vessel 102 is gliding, the bottom 101a of the hull and the water surface are at substantially the same height, and thus the entire electric motor 2 is located above the water surface. Consequently, even when the electric motor 2 is provided in the outboard motor 100, an increase in the underwater resistance is significantly reduced or prevented.

According to the first preferred embodiment of the present invention, the outboard motor 100 includes the bracket 8 attached to the hull 101. Furthermore, the electric motor 2 includes the upper end 2b positioned below the lower end 84a of the bracket 8. Accordingly, the electric motor 2 is located in a space below the bracket 8, and thus the electric motor 2 is easily disposed in the outboard motor 100, and the electric motor 2 is easily disposed below the waterline WL.

Second Preferred Embodiment

The structure of an outboard motor 200 according to a second preferred embodiment of the present invention is now described with reference to FIG. 11. In the second preferred embodiment, openings 76a and 76b are not provided in a case 207 of the outboard motor 200, unlike the first preferred embodiment in which the outboard motor 100 includes the case 7 including the openings 76a and 76b in order for water to flow into the water storage 76. In the second preferred embodiment, the same or similar structures as those of the first preferred embodiment are denoted by the same reference numerals, and description thereof is omitted.

Figure 11:
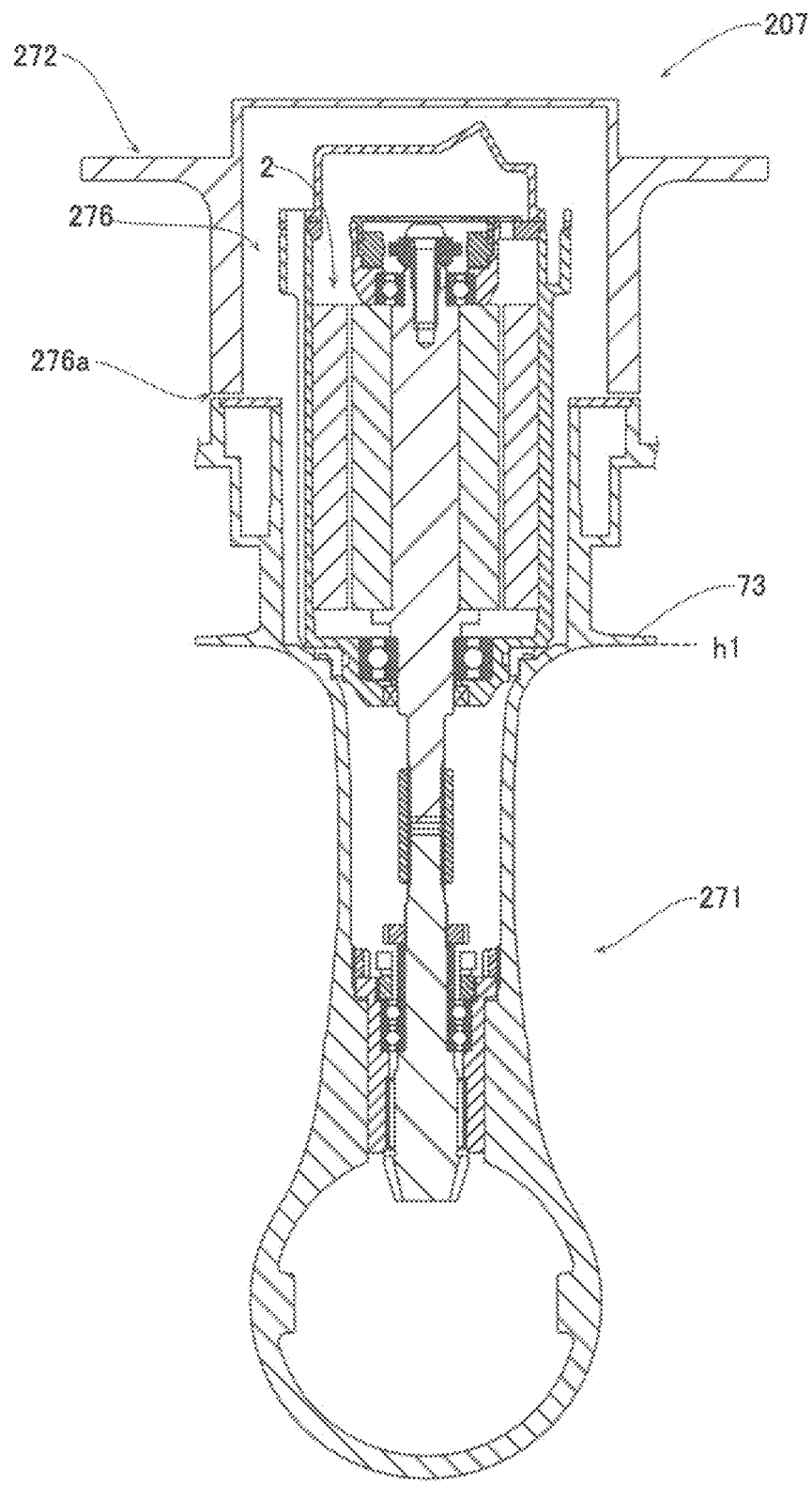
FIG. 11 is a front view showing the structure of an outboard motor according to a second preferred embodiment of the present invention.

As shown in FIG. 11, the outboard motor 200 according to the second preferred embodiment includes the case 207. The case 207 includes a lower case 271 and an upper case 272. The upper case 272 does not include openings 76a described in the first preferred embodiment, and the lower case 271 does not include openings 76b described in the first preferred embodiment.

A water storage 276 in which the electric motor 2 is housed is provided inside the case 207. Furthermore, a seal is not provided in a boundary 274 between the upper case 272 and the lower case 271 such that a clearance 276a is provided in the case 207. The clearance 276a is provided above the height h1 of a plate 73. When the outboard motor 200 is operating at a low speed or is stopped, water flows into the water storage 276 via the clearance 276a when the water surface rises to a waterline WL (see FIG. 1). The remaining structures of the second preferred embodiment are similar to those of the first preferred embodiment.

According to the second preferred embodiment of the present invention, the following advantageous effects are achieved.

According to the second preferred embodiment of the present invention, the clearance 276a is provided due to no seal being provided in the boundary 274 between the upper case 272 and the lower case 271 such that water flows from the outside of the case 207 into the case 207 via the clearance 276a. Accordingly, water flows into the case 207 via the boundary 274 between the upper case 272 and the lower case 271, and thus water flows into the case 207 without a hole. Consequently, the clearance 276a is easily provided. The remaining advantageous effects of the second preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the entire electric motor is preferably disposed above the anti-cavitation plate and below the waterline WL in each of the first and second preferred embodiments described above, the present invention is not restricted to this. That is, a portion of the electric motor may alternatively be disposed below the anti-cavitation plate, or a portion of the electric motor may alternatively be disposed above the waterline.

While the case preferably includes the water storage in each of the first and second preferred embodiments described above, the present invention is not restricted to this. That is, the electric motor may alternatively be cooled via the case (the side surfaces of the upper case or the side surfaces of the lower case) without providing the water storage in the case. For example, the electric motor may contact the side surfaces of the upper case or the side surfaces of the lower case below the waterline.

While the electric motor is preferably disposed in the upper case and the lower case in each of the first and second preferred embodiments described above, the present invention is not restricted to this. For example, the electric motor may alternatively be housed in a motor case different from the upper case and the lower case, and the motor case may alternatively be exposed to the outside (underwater) of the upper case and the lower case.

While the electric motor is preferably disposed forward of the drive shaft in each of the first and second preferred embodiments described above, the present invention is not restricted to this. For example, the electric motor may alternatively be disposed rearward of the drive shaft.

While the openings are preferably provided above the anti-cavitation plate in the first preferred embodiment described above, the present invention is not restricted to this. For example, the openings may alternatively be provided below the anti-cavitation plate.

While four openings are preferably provided in the first preferred embodiment described above, the present invention is not restricted to this. That is, three or less openings or five or more openings may alternatively be provided.

While the openings are preferably open to the front side in the first preferred embodiment described above, the present invention is not restricted to this. That is, the openings may alternatively be open in a direction (to the rear side, for example) other than the front side.

While the openings and the clearance are preferably provided above the anti-cavitation plate and below the upper anti-splash plate in each of the first and second preferred embodiments described above, the present invention is not restricted to this. That is, the openings and the clearance may alternatively be provided above the upper anti-splash plate as long as the same are located below the waterline.

While the openings or the clearance is preferably provided above the water intakes in each of the first and second preferred embodiments described above, the present invention is not restricted to this. That is, the openings or the clearance may alternatively be provided at the same height as or below the water intakes.

While the electric motor and the water pump preferably overlap each other at the predetermined height in each of the first and second preferred embodiments described above, the present invention is not restricted to this. That is, the electric motor and the water pump may not overlap each other at the predetermined height.

While the electric motor and the water pump are preferably disposed adjacent to each other in the forward-rearward direction in each of the first and second preferred embodiments described above, the present invention is not restricted to this. That is, the electric motor and the water pump may alternatively be disposed side by side in the right-left direction, or another member may alternatively be disposed between the electric motor and the water pump in the forward-rearward direction.

While the electric motor is preferably disposed below the anode in each of the first and second preferred embodiments described above, the present invention is not restricted to this. That is, the electric motor may alternatively be disposed at the same height as or above the anode.

While the upper end of the electric motor is preferably positioned below the lower end of the bracket in each of the first and second preferred embodiments described above, the present invention is not restricted to this. That is, the upper end of the electric motor may alternatively be positioned above the lower end of the bracket.

While the case preferably includes both the openings and the clearance through which water flows into the water storage in the first preferred embodiment described above, the present invention is not restricted to this. That is, in the first preferred embodiment, a seal may alternatively be provided between the upper case and the lower case such that the clearance is not provided, and the case may alternatively include only the openings through which water flows into the water storage.

While the case preferably includes the openings or the clearance as an example of the water inlet in each of the first and second preferred embodiments described above, the present invention is not restricted to this. For example, the case may alternatively include a notch as the water inlet.

While the outboard motor is preferably specified to rotate forward (specified to move forward when the propeller rotates clockwise (in the r1 direction) as viewed from the rear of the outboard motor) in each of the first and second preferred embodiments described above, the present invention is not restricted to this. For example, the outboard motor may alternatively be specified to rotate reversely (specified to move forward when the propeller rotates counterclockwise (in the r2 direction) as viewed from the rear of the outboard motor). In such a case, the second front bevel gear functions as a reverse gear, and the second rear bevel gear functions as a forward gear. That is, when a driving force is transmitted from the engine to the propeller via the transmission path R1a, the marine vessel moves rearward, and when a driving force is transmitted from the engine to the propeller via the transmission path R1b, the marine vessel moves forward.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine;
   an electric motor;
   a propeller that rotates due to a driving force from the engine and a driving force from the electric motor; and
   an anti-cavitation plate disposed above the propeller; wherein
   at least a portion of the electric motor is disposed above the anti-cavitation plate and below a waterline of an outboard motor body.

2. The outboard motor according to claim 1, further comprising a case to allow water to flow from an outside of the case into the case above the anti-cavitation plate and below the waterline of the outboard motor body; wherein
   the at least the portion of the electric motor is housed in the case.

3. The outboard motor according to claim 2, wherein the case includes a water storage that surrounds the electric motor and stores the water that has flowed from the outside of the case into the case.

4. The outboard motor according to claim 3, further comprising a drive shaft that extends in an upward-downward direction of the outboard motor and rotates due to the driving force from the engine; wherein
   the case includes an exhaust passage rearward of the drive shaft; and
   the electric motor is disposed forward of the drive shaft.

5. The outboard motor according to claim 2, further comprising a propeller shaft to transmit the driving forces from the engine and the electric motor to the propeller; wherein
   the case includes a lower case that houses the propeller shaft and an upper case that houses the at least the portion of the electric motor, and the upper case is disposed above the lower case; and
   a minimum width of the lower case in a right-left direction of the outboard motor is less than a maximum width of the electric motor in the right-left direction.

6. The outboard motor according to claim 2, wherein the case includes a water inlet through which the water flows from the outside of the case into the case.

7. The outboard motor according to claim 6, wherein the water inlet is provided on a side surface of the case.

8. The outboard motor according to claim 7, wherein the water inlet is open to a front side of the outboard motor on the side surface of the case.

9. The outboard motor according to claim 6, wherein
   the case includes an anti-splash plate disposed above the anti-cavitation plate; and
   the water inlet is disposed above the anti-cavitation plate and below the anti-splash plate.

10. The outboard motor according to claim 6, further comprising a water pump to take in water from the outside of the case via a water intake and to supply the water that has been taken in to the engine due to the driving force from the engine; wherein
    the water inlet is disposed above the water intake.

11. The outboard motor according to claim 10, wherein the electric motor and the water pump overlap each other at a predetermined height of the outboard motor.

12. The outboard motor according to claim 11, wherein the electric motor and the water pump are disposed adjacent to each other in a forward-rearward direction of the outboard motor.

13. The outboard motor according to claim 6, further comprising a propeller shaft to transmit the driving forces from the engine and the electric motor to the propeller; wherein
    the case includes a lower case that houses the propeller shaft and an upper case that houses the at least the portion of the electric motor, and the upper case is disposed above the lower case; and
    the water inlet is provided in the upper case.

14. The outboard motor according to claim 6, further comprising a propeller shaft to transmit the driving forces from the engine and the electric motor to the propeller; wherein
    the case includes a lower case that houses the propeller shaft and an upper case that houses the at least the portion of the electric motor, and the upper case is disposed above the lower case; and the water inlet is defined by a gap in a boundary between the upper case and the lower case such that water flows from the outside of the case into the case via the water inlet.

15. The outboard motor according to claim 6, wherein the water inlet includes a plurality of water inlets.

16. The outboard motor according to claim 1, further comprising an anode disposed below the waterline; wherein the electric motor is disposed below the anode.

17. The outboard motor according to claim 1, wherein the electric motor includes a lower end positioned above a lower end of the anti-cavitation plate, and an upper end positioned below the waterline.

18. The outboard motor according to claim 1, wherein the electric motor includes a lower end positioned above a bottom of a hull.

19. The outboard motor according to claim 18, further comprising a bracket to attach to the hull; wherein
the electric motor includes an upper end positioned below a lower end of the bracket.

20. An outboard motor attached to a hull, the outboard motor comprising:
an engine;
an electric motor; and
a propeller that rotates due to a driving force from the engine and a driving force from the electric motor; wherein
at least a portion of the electric motor is disposed above a bottom of the hull and below a waterline of the hull.

* * * * *